Figure 1:
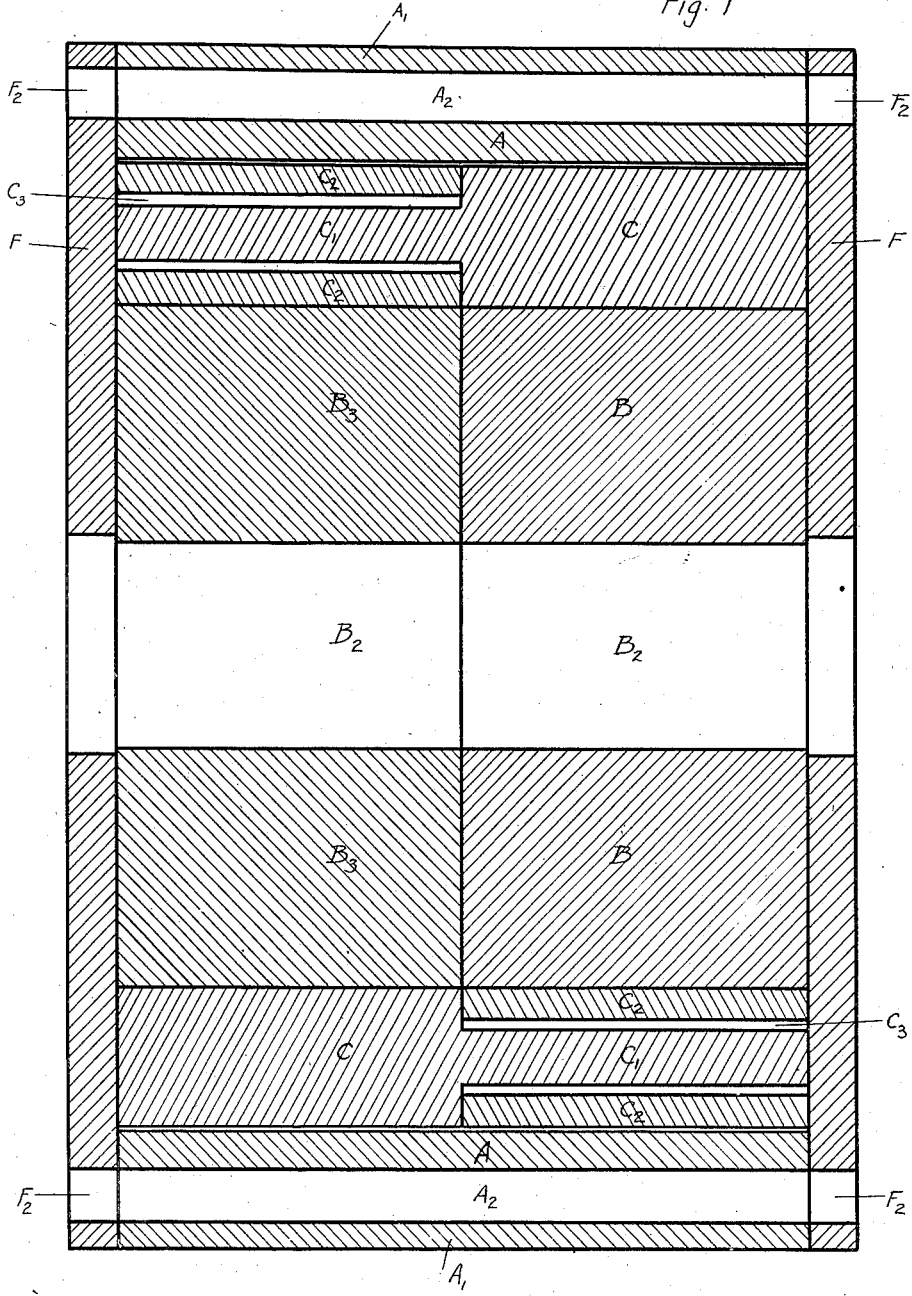

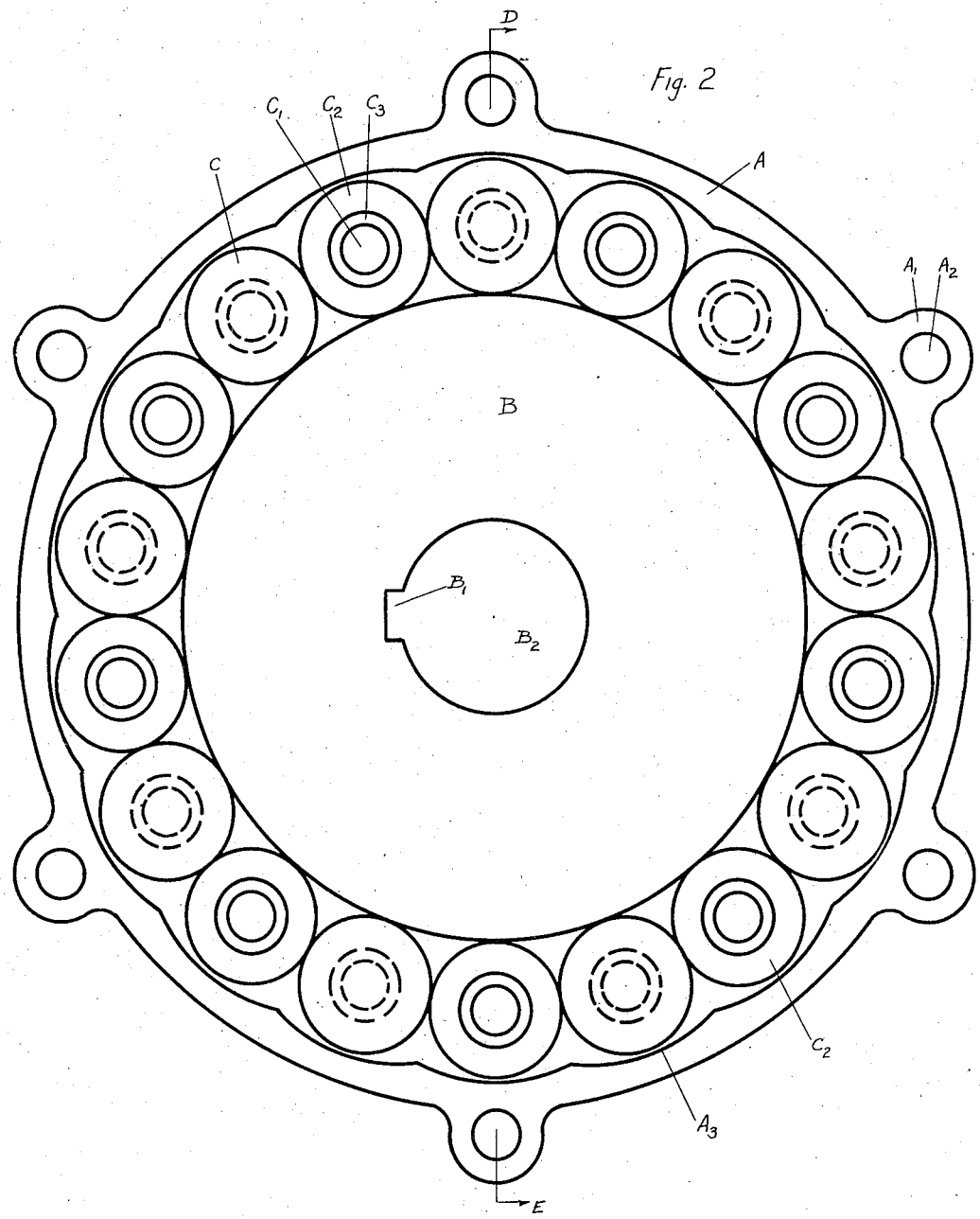

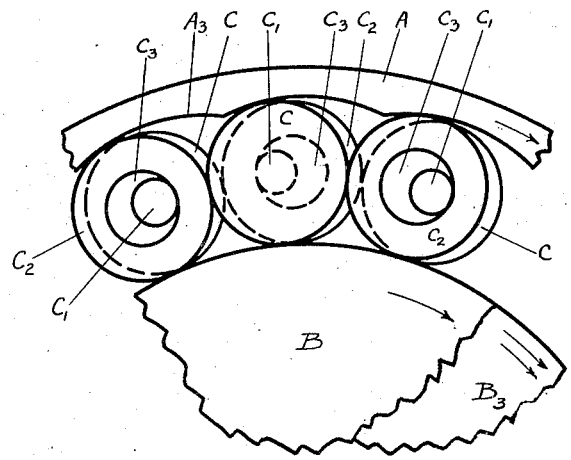
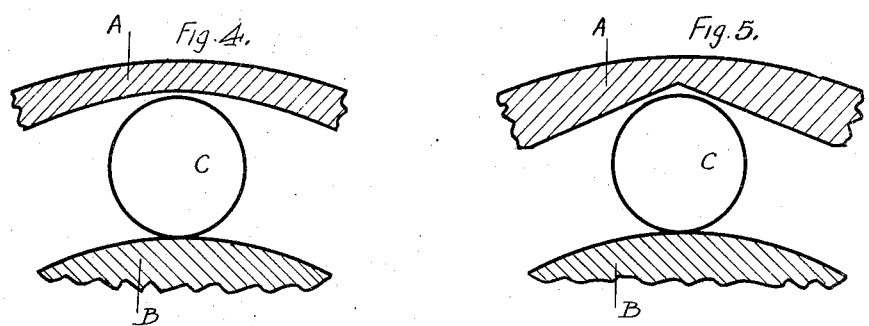

Patented Aug. 19, 1924.

1,505,124

UNITED STATES PATENT OFFICE.

CIPRIANO ANDRADE, JR., OF NEW YORK, N. Y.

DIFFERENTIAL.

Application filed March 15, 1923. Serial No. 625,333.

*To all whom it may concern:*

Be it known that I, CIPRIANO ANDRADE, Jr., a citizen of the United States, residing at New York, in the county of New York and State of New York, have invented a new and useful Differential, of which the following is a specification.

My invention relates to differentials; and the object of my invention is to gain the utmost possible mechanical advantage for my locking rollers whose functions have been fully described in my preceding applications, Serial Numbers 584,346; 585,843 and 597,-707; also to simplify the construction of my multiple roller design by eliminating the control members shown in my said applications 585,843 and 597,707, also to further facilitate the unlocking function of the parts.

I attain these objects by the mechanism illustrated in the accompanying drawings, in which—

Fig. 1 is a longitudinal section elevation of my entire device on the line DE of Fig. 2; Fig. 2 is an end view of the device with one of the flanges F removed, and with all the rollers C and $C^2$ in neutral position; Fig. 3 is a diagrammatic view of part of my device performing its differential function, with the rollers C and $C^2$ locked on driven member B, and unlocked on driven member $B^3$. The single arrows on parts A and B indicate their uniform speed, and the two arrows on $B^3$ indicate its excess speed over A and B.

Fig. 4 is a section of driving member A with an eccentric arc of noncircular form; and Fig. 5 is a section of driving member A with a straight contact surface to engage roller C.

Similar letters refer to similar parts throughout the several views.

A is the driving member, with bolt lugs $A^1$ and bolt holes $A^2$, and eccentric arcs $A^3$. F is a flange with bolt holes $F^2$, coinciding with bolt holes $A^2$. The usual master gear is attached in any appropriate manner to driving member A. B is one of the driven members with keyway $B^1$ to engage the key on the end of one of the driven shafts, and hole $B^2$ to take the end of one of the driven shafts. $B^3$ is the other driven member with keyway $B^1$. C are locking rollers which engage driving member A and driven members B and $B^3$ respectively. Locking rollers C have lugs $C^1$ extending the full length or any portion of the length of hollow locking rollers $C^2$, which contain recesses $C^3$ of greater diameter than lugs $C^1$.

While Figs. 1, 2, 3, 4 and 5 of my drawings show an open space clearance between the rollers C, $C^2$, and the middle of the eccentric arcs or driving surface $A^3$ of driving member A, it will be understood that said open space clearance may be as small as desired, and may be reduced to a mere rotative clearance, which is sometimes referred to as a rotative contact, as such a clearance is invisible to the naked eye of the observer, and can be measured only by refined precision instruments. These various clearance dimensions have been indicated in the drawings and mentioned in the specifications of my previous applications, Serial Nos. 584,346; 585,843; and 597,707.

While my drawings disclose absence of all direct or indirect circumferential contact between the driving member and the driven members, it will be understood that my invention covers and my device will function whether or not there is direct circumferential contact or indirect circumferential contact or no circumferential contact between the driving member and the driven members.

The operation of my device has been fully explained in my said pending applications, Serial Numbers 584,346; 585,843 and 597,707.

It will be observed that in my application No. 584,346, there is only one locking roller for each driven member, which concentrates the entire transmission stress of each driven member on to one contact line between the driven member and the roller, and between the roller and the driving member. It will be observed that in my applications Nos. 585,843 and 597,707, by using a multiplicity of locking rollers, I increase the number of contact lines, and thus diminish the stress on each contact line.

My present invention carries to its ultimate point this mechanical advantage due to increasing the number of contact lines. Whereas in my application Nos. 585,843 and 597,707 I employed control members to regulate the relative circumferential position of my rollers, my present invention eliminates these control members, and makes the rollers function not only as locking members, but also as control members. As disclosed by Figs. 2 and 3 of the drawings, it will be noted that the rollers on each driven member are so closely arranged that they are always in contact and therefore act to compel each other to maintain parallelism not only with each other but with the axes of the driving and driven members, and also that they must go into locking or unlocking relation together. It will be understood that the word "contact" used in the preceding sentence and in the claims means such contact as is usual in the moving and working parts of mechanical devices which allows the usual minute clearance necessary to permit the usual relative motion of one part against the other. In my present device therefore, I not only increase the number of rollers and contact lines, but I increase the length of each roller, and each contact line, by eliminating the wasted space occupied by the control members in my applications Nos. 585,843 and 597,707.

While I have shown lugs connecting each pair of rollers in my drawings, it will be understood that even with one lug connecting one pair of rollers, my device would function.

I claim:

1. In a differential; a driving member; a driven member; and a plurality of locking rollers between the driving member and the driven member, the said locking rollers being arranged in contact with each other.

2. In a differential; a driven member; a driving member with a plurality of arcs eccentric to the circumference of the driven member; and a locking roller in each of said eccentric arcs, said rollers being arranged in contact with each other.

3. In a differential; a driven member; a driving member with a plurality of surfaces nonparallel with the circumference of the driven member; and a locking roller between each of said surfaces and the driven member, said rollers being arranged in contact with each other.

4. In a differential; a driving member; a first driven member; a second driven member; a first plurality of locking rollers between the driving member and the first driven member, said locking rollers being arranged in contact with each other; and a second plurality of locking rollers between the driving member and the second driven member, said locking rollers being arranged in contact with each other.

5. In a differential; a first driven member; a second driven member; a driving member with a plurality of surfaces nonparallel with the circumferences of the respective driven members; a first plurality of locking rollers comprising a locking roller between each of said surfaces and the first driven member, said locking rollers arranged in contact with each other; a second plurality of locking rollers comprising a locking roller between each of said surfaces and the second driven member, said locking rollers being arranged in contact with each other; and means whereby the first plurality of rollers and the second plurality of rollers may exercise a limited circumferential motion in relation to each other.

6. In a differential; a first driven member; a second driven member; a driving member with a plurality of surfaces nonparallel with the circumferences of the respective driven members; a first plurality of locking rollers comprising a locking roller between each of said surfaces and the first driven member, said locking rollers being arranged in contact with each other; a second plurality of locking rollers comprising a locking roller between each of said surfaces and the second driven member, said locking rollers being arranged in contact with each other; and a projection from one of the rollers in one plurality of rollers which enters into a recess in one of the rollers in the other plurality of rollers, whereby the first plurality of rollers and the second plurality of rollers may exercise a limited circumferential motion in relation to each other.

7. In a differential; a first locking roller having a longitudinal open space extending the entire length of the roller; and a second locking roller having a longitudinal lug adapted to enter the open space in the first locking roller and to extend substantially the entire length of said open space, said lug having a diameter less than the diameter of said open space.

8. In a differential; a driving member; a first driven member; a second driven member; a first locking roller adapted to lock or unlock the driving member and the first driven member, said first locking roller having a longitudinal open space extending the entire length of the roller; and a second locking roller adapted to lock or unlock the driving member and the second driven member, said second locking roller having a longitudinal lug adapted to enter the open space in the first locking roller and to extend substantially the entire length of said open space, said lug having a diameter less than the diameter of said open space.

9. In a differential; a driving member; a first driven member inside of the driving member, said driven member being at all times out of direct contact with the driving member; a second driven member inside of the driving member, said driven member being at all times out of direct contact with the driving member; a first set of locking rollers between the driving member and the first driven member and adapted to lock or unlock said driving and driven member either forward or reverse; a second set of locking rollers between the driving member and the second driven member and adapted to lock or unlock said driving and driven member either forward or reverse; said two sets of locking rollers having means integral with themselves whereby the first set is capable of limited circumferential motion with relation to the second set.

10. In a differential; a driving member; a first driven member, said driven member being at all times out of direct contact with the driving member; a second driven member, said driven member being at all times out of direct contact with the driving member; a first set of locking rollers between the driving member and the first driven member and adapted to lock or unlock said driving and driven member either forward or reverse; a second set of locking rollers between the driving member and the second driven member and adapted to lock or unlock said driving and driven member either forward or reverse; said two sets of locking rollers having means integral with themselves, whereby the first set is capable of limited circumferential motion with relation to the second set.

11. In a differential; a driving member; a driven member; and a plurality of locking rollers occupying the entire circumferential space between the driving member and the driven member, said locking rollers being arranged in contact with each other.

12. In a differential; a driving member, a driven member located inside of said driving member; and a multiplicity of locking rollers located between said driving member and said driven member, said locking rollers being arranged in contact with each other.

13. In a differential; a first driven member; a second driven member; a driving member with a plurality of surfaces non-parallel with the circumferences of the respective driven members; a first plurality of locking rollers comprising a locking roller between each of said surfaces and the first driven member, said locking rollers being arranged in contact with each other; a second plurality of locking rollers comprising a locking roller between each of said surfaces and the second driven member, said locking rollers being arranged in contact with each other; and projections from each one of a multiplicity of the rollers in one plurality of rollers, each of which projections enters into a recess in a corresponding roller in the other plurality of rollers, whereby the first plurality of rollers and the second plurality of rollers may exercise a limited circumferential motion in relation to each other.

14. In a differential; a driving member; a first driven member; a second driven member; a first plurality of locking rollers between the driving member and the first driven member, the said locking rollers being arranged in contact with each other; a second plurality of locking rollers between the driving member and the second driven member, the said locking rollers being arranged in contact with each other; and a projection from one of the rollers in one plurality of rollers which enters into a recess in one of the rollers in the other plurality of rollers, whereby the first plurality of rollers and the second plurality of rollers may exercise a limited circumferential motion in relation to each other.

15. In a differential; a driving member; a first driven member; a second driven member; a first plurality of locking rollers between the driving member and the first driven member, the said locking rollers being arranged in contact with each other; a second plurality of locking rollers between the driving member and the second driven member, the said locking rollers being arranged in contact with each other; and projections from each one of a multiplicity of the rollers in one plurality of rollers, each of which projections enters into a recess in a corresponding roller in the other plurality of rollers, whereby the first plurality of rollers and the second plurality of rollers may exercise a limited circumferential motion in relation to each other.

CIPRIANO ANDRADE, Jr.

Witnesses:
JAMES W. BAILEY,
ELEANOR HAIGHT.